(12) United States Patent
Durham et al.

(10) Patent No.: US 10,515,399 B1
(45) Date of Patent: Dec. 24, 2019

(54) SYSTEM, METHOD AND MEDIUM FOR UTILIZING CURRENT AND HISTORICAL DEVICE CONTEXT INFORMATION TO DETERMINE CONTENT ITEM RECOMMENDATIONS

(71) Applicant: Amazon Technologies, Inc., Seattle, WA (US)

(72) Inventors: Brandon Scott Durham, Seattle, WA (US); Toby Ray Latin-Stoermer, Seattle, WA (US); Darren Levi Malek, Seattle, WA (US); Christopher Lon McGilliard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 729 days.

(21) Appl. No.: 14/571,180

(22) Filed: Dec. 15, 2014

(51) Int. Cl.
*G06Q 30/00* (2012.01)
*G06Q 30/06* (2012.01)

(52) U.S. Cl.
CPC .............. *G06Q 30/0631* (2013.01)

(58) Field of Classification Search
CPC ................................ G06Q 30/0631
USPC ...................................... 705/26.7
See application file for complete search history.

(56) References Cited

U.S. PATENT DOCUMENTS

| | | |
|---|---|---|
| 7,664,669 B1 | 2/2010 | Adams et al. |
| 7,685,074 B2 | 3/2010 | Linden et al. |
| 2008/0059422 A1* | 3/2008 | Tenni ............... G06F 16/68 |
| 2008/0222546 A1 | 9/2008 | Mudd et al. |
| 2010/0153846 A1* | 6/2010 | Roy ............... G11B 27/034 715/716 |
| 2013/0019185 A1* | 1/2013 | Zhang ............. G06Q 10/109 715/752 |
| 2013/0110992 A1 | 5/2013 | Ravindra et al. |
| 2013/0268396 A1* | 10/2013 | Agevik ............ G06Q 30/0631 705/26.7 |
| 2013/0271602 A1* | 10/2013 | Bentley ............... H04N 7/18 348/143 |

(Continued)

OTHER PUBLICATIONS

Mobile Phone Sensing Systems: A Survey (Year: 2013).*
U.S. Appl. No. 13/712,721, filed Dec. 12, 2012.

*Primary Examiner* — Jeffrey A. Smith
*Assistant Examiner* — Lalith M Duraisamygurusamy
(74) *Attorney, Agent, or Firm* — Knobbe, Martens, Olson & Bear, LLP

(57) ABSTRACT

The present disclosure provides computer-implemented systems and processes for augmenting user ratings of items, such as a rating of a song playing on a user device, by analyzing contextual information, such as user and/or device activity data associated with the device. The contextual information may be used to determine an associated intensity of the rating or feedback. The determined intensity levels can be used to weigh the associated rating events and improve the quality of item recommendations that are based on such ratings. Contextual information may indicate whether the user transitioned from another application to rate an item, device status information, and so on. In one embodiment, contextual information can be used to assess how intensely the user feels about a music item and to provide improved music recommendations, such as songs to provide in a playlist or radio station, based on the intensity.

22 Claims, 5 Drawing Sheets

(56) References Cited

U.S. PATENT DOCUMENTS

| | | | |
|---|---|---|---|
| 2014/0180448 A1* | 6/2014 | Aminzade | A63B 24/0021 |
| | | | 700/91 |
| 2014/0188925 A1* | 7/2014 | Skolicki | H04N 21/4622 |
| | | | 707/765 |
| 2014/0281978 A1* | 9/2014 | Ye | G06F 3/01 |
| | | | 715/716 |
| 2014/0379744 A1* | 12/2014 | Kuo | G06F 3/0237 |
| | | | 707/767 |
| 2015/0037771 A1* | 2/2015 | Kaleal, III | G09B 5/02 |
| | | | 434/257 |

* cited by examiner

US 10,515,399 B1

SYSTEM, METHOD AND MEDIUM FOR UTILIZING CURRENT AND HISTORICAL DEVICE CONTEXT INFORMATION TO DETERMINE CONTENT ITEM RECOMMENDATIONS

BACKGROUND

Web sites and other types of interactive electronic catalog systems commonly include recommendation systems for providing recommendations of items such as items that are available for download and/or purchase. The recommendations are typically generated based on monitored user activities or behaviors, such as item purchases, item viewing events, item play events, item rentals, and/or other types of item consumption actions. In some systems, the recommendations are additionally or alternatively based on users' explicit ratings of items.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1:
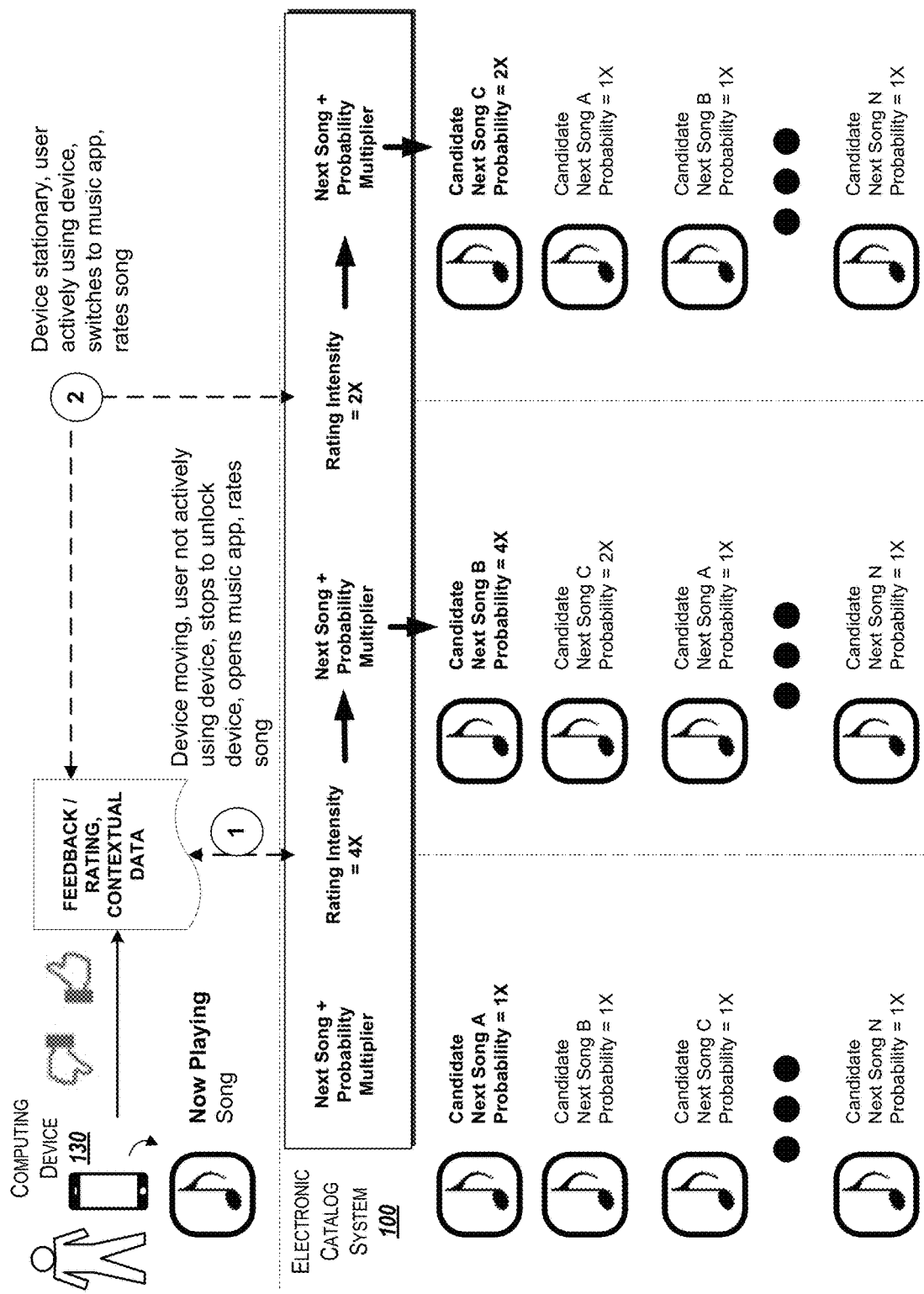
FIG. 1 is a data flow diagram illustrating how contextual data associated with a user's feedback rating may be used to determine an associated intensity rating to improve a recommendation of a music item, as implemented by an interactive system, such as the interactive system of FIG. 5.

Several different computer-implemented processes will now be described for using user and/or device activity to measure intensity of feedback for items available in an electronic catalog to improve the utility of item recommendations provided to users. These processes may be embodied individually or in any combination in a multi-user computer system ("system"). A recommendation engine capable of ranking, re-ranking, and selecting items to recommend to a user based on a set of source items may also be used.

Network-based music services have become an increasingly popular way for music enthusiasts and casual listeners alike to access and listen to music in a digital format. Music services are often set up to stream content from an electronic catalog, and are typically accessible from mobile and desktop computing devices, as well as home entertainment systems, televisions, USB-based media streaming devices, and practically any other computing device configured to access a media library either on a local network or over the Internet.

Music services, including those provided by the interactive system described herein, provide a variety of ways by which users can preview, listen to, purchase, rent, and otherwise consume music and other forms of audio-based content. Users can explore a music catalog which is frequently organized by genre, artist, album, tags, and other categories or attributes. One increasingly popular way by which users enjoy the music catalog is by playlists or "radio" stations, which can be user-specified or pre-generated by the music service. For example, a user may be able to create a personalized radio station by indicating a particular genre, artist, or other criteria of interest. The music service may then identify particular songs for the user's personal radio which the user may find of interest, based on the particular genre, artist, or other criteria specified by the user. Or, in another example, the music service may offer one or more pre-configured radio stations based on popular genres, artists, songs, and the like.

When a user has selected a particular radio station (either a personalized radio station or a pre-configured radio station), the music service selects and streams songs to the user based on the criteria associated with the radio station. Highly complex musical analysis and artificial intelligence algorithms may be involved in predicting songs which may be of interest to the user based on the criteria associated with the radio station. Due to the subjective nature of user's musical preferences, one way by which the predictions and selected songs for the radio station may be improved over time is by allowing users to provide feedback or ratings for songs played on the radio station. Received user ratings may be in the form of a thumbs up or thumbs down (e.g., "yes" or "no"), stars (e.g., one to five stars, with five stars indicating a strong like and one star indicating a strong dislike), alpha numeric ratings (e.g., A, B, C, 1, 2, 3, etc.). Based on whether the user provided a favorable (liked) or unfavorable (disliked) rating for a song, the music service may identify candidate songs which are similar to the liked or disliked song and increase or decrease the likelihood that those candidate songs may be selected for playback. One problem with existing ratings-based recommendations systems is that they fail to take into consideration how strongly users feel about the ratings they assign to particular items.

The present disclosure describes a system and associated processes that are capable of measuring and recording the rating intensity associated with particular rating events. Determining the intensity of the user's feeling about the rating can be difficult. The systems and methods described herein provide the capability to utilize contextual information (such as user and/or device activity) associated with the rating to determine an intensity associated with the rating. For example, if the user is engaged in another activity and is motivated to stop that activity in order to provide a rating for music, then the user may higher level of intensity or passion for the rating. Thus, the intensity may be determined at least in part by generating a measure of the effort expended by the user to rate a music item, or by generating a measure of a degree to which the user modified his activity to rate the music item.

Contextual information for a rating may be determined, detected, or accessed by or from a computing device used by the listener to provide the rating. The contextual information may include, describe, or otherwise indicate data and information related to the computing device and/or the user's activity with respect to the computing device. Contextual information may include, for example, what the user is doing in the music application when the rating is given (e.g., browsing the music catalog, creating a playlist, etc.); what the user is doing in another application before the rating is given (e.g., reading a book in a document reader application, browsing a web site in a web browser application, viewing and/or posting content in a social media application, etc.); accelerometer and/or motion detector data associated with the computing device indicating whether the device is stationary or in motion, and if so to what extent (e.g., jostling as in the user's hand, moving smoothly as in a car, and so on) and whether the user discontinued such motion just before the user rating was provided; whether the user stopped some activity before entering or providing a rating; state information associated with the computing device (e.g., whether a display screen is on or off, whether the device is connected to a network, whether the device is linked to another device such as a car, and so on); a physical location of the computing device (e.g., as detected by location services, GPS coordinates, and so on); a date and time of day when the rating is given; information about other applications which may be running on the computing device, and whether those applications are running in the foreground or background; and/or when or how recently the computing device was unlocked or activated from a standby or passive state. Contextual information may also include measurements and other data describing how long the user has been listening to music in the current or past listening sessions, other songs the user may have listened to and/or skipped in the current or past listening sessions, a song progress indication of how much of the song was played before giving the rating, and/or whether the user skipped around in the song before giving the rating (e.g., whether the user jumped ahead to another portion of the song, such as the chorus; whether the user moved back to repeat a portion of the song; and so on). Further, contextual information could include audio input data, such as audio cues which may be detected by the computing device (e.g., a microphone on the computing device may detect the user verbally indicating dislike of the song, the user issuing a voice command to skip a song, and so on).

Contextual information can be analyzed to determine or assess how intensely users feel about particular songs available in the electronic catalog. For example, contextual information may indicate that at the approximate time that the user feedback or rating is detected by a music application installed on the user's computing device, the user was actively using the music application to browse, in which case the user may have had to expend very little extra effort to provide the feedback or rating. The system described herein may analyze this data and determine that the relative intensity of the feedback or rating is low because the user was already engaged in the music application and did not need to expend extra effort to provide the feedback or rating. In another example, contextual information may indicate that immediately before the user rated a song, the user was not actively using the device or another application was active in the foreground, in which case the user may have had to expend extra effort to unlock the device and/or switch from the other application to the music application to provide the feedback or rating. The system described herein may analyze this data and determine that the relative intensity of the feedback or rating is high because the user was not already engaged in the music application and had to expend extra effort to provide the feedback or rating.

In some embodiments, contextual information may be gathered and analyzed over time to develop trends in user feedback patterns with respect to certain contextual information data points, both at the individual user level and for an aggregate group of users. These trends may be used to identify certain behaviors and contexts which tend to indicate higher degrees of intensity associated with feedback or ratings. The trends may also be used in conjunction with hypothesis testing and machine learning algorithms to, for example, identify which particular contextual information data points correlate to higher degrees of determined intensity, both in the aggregate level and at a granular level (e.g., per item, per song, per segment of a song, etc.). Aggregated ratings and contextual data may also be used to identify items or songs which tend to invoke more intense feelings, which can be used to generate or seed candidate lists, such as a "Hot Hits" radio station comprised of songs which users tend to rate positively with a certain level of intensity.

Contextual information, user feedback, and determined intensity ratings may also be used in various combinations to determine similarities or similarity scores for songs or, more generally, items. For example, in order to identify songs which may go well together in a particular context, such as a user running or exercising, songs which have been rated favorably by users while running may be identified as potentially going well together; or songs which have determined intensities while running may be identified as potentially going well together. Similarity determinations or scores may be increased for songs which have received higher intensity ratings within the particular context. These similarity determinations may be used to, for example, generate a playlist or radio including songs which may be well-suited for particular contexts (e.g., running, reading, driving, studying, and so on).

In an embodiment, determining and providing a music item recommendation (e.g., a next song) for the user may comprise the following: receiving current contextual information associated with playback of a music item (e.g., a now playing song), wherein the music item is streamed from a network-based music service, and wherein the current contextual information indicative of an activity which a user appears to be performing, the current contextual information detected during playback of the music item via a music application installed on a consumer computing device of the user; accessing historical user activity data (e.g., listening history data) associated with the user, the historical user activity data indicating a plurality of music items (e.g., other songs) previously listened to by the user and historical contextual information associated with playback of at least some of the plurality of music items; determining, based on a comparison of the current contextual information and the historical contextual information, at least one music item previously listened to by the user while performing the activity; selecting or determining, from a plurality of candidate music item recommendations (e.g., a next song to play), a music item recommendation for the user based at least in part on a comparison of the at least one music item previously listened to by the user while performing the activity to the plurality of candidate music item recommendations; and providing the music item recommendation to the music application installed on the consumer computing device for presentation (e.g., playback) to the user. In one embodiment, selecting or determining the music item recommendation for the user is based at least in part on a similarity rating between the music item previously listened to by the user while performing the activity to the plurality of candidate music item recommendations.

According to one embodiment, a computer-implemented method comprises: under control of a computing device configured with specific computer-executable instructions: receiving a user rating of a song, said song streamed from a network-based music service, said user rating provided by a user of the music service during playback of the song via a music application installed on a consumer computing device associated with the user; receiving contextual information associated with the user rating, said contextual information indicative of user activity with respect to the consumer computing device, said contextual information detected by the music application when the user provided the rating; analyzing the contextual information to determine an intensity of the user rating of the song; selecting a next song for the user based at least in part on the provided user rating and the determined intensity; and providing the next song to the music application installed on the consumer computing device for playback for the user.

In another embodiment, the song is streamed from the network-based music service as part of a radio station or a playlist. In some embodiments, the music application is a mobile application installed on the consumer computing device. In some embodiments, the contextual information includes accelerometer data associated with the consumer computing device indicating whether the device was in motion and whether the user discontinued such motion just before the user rating was provided. In some embodiments, the intensity of the user rating of the song is determined at least in part by generating a measure of the effort expended by the user to rate the song.

In one embodiment, a system comprises: an electronic data store configured to at least store ratings data for one or more music items available from an electronic catalog and contextual information associated with respective ratings, said ratings data submitted from a plurality of users of the electronic catalog; and a computing system comprising one or more hardware computing devices, said computing system in communication with the electronic data store and configured to at least: access, from the electronic data store, rating data indicative of a user rating of a music item in association with a music service provided by the electronic catalog; access, from the electronic data store, contextual information associated with the user rating, said contextual information indicative of device status information for a consumer computing device used by the user to provide the rating, said contextual information collected at a time when the user provided the rating; determine an intensity of the user rating of the music item based at least in part on the contextual information; determine a music item recommendation for the user based at least in part on the provided user rating and the determined intensity; and provide the music item recommendation to the consumer computing device for presentation to the user. In some embodiments, the rating data and the contextual information are received from a mobile music application installed on the consumer computing device.

In another embodiment, to determine an intensity of the user rating of the music item based at least in part on the contextual information the computing system is further configured to: determine, based on the device status information, that the user was interacting with the consumer computing device during playback of the music item but before the user rating was provided; and decrease the intensity of the user rating, relative to the intensity of the user rating if the user was not interacting with the consumer computing device during playback of the music item but before the user rating was provided. In one embodiment, to determine an intensity of the user rating of the music item based at least in part on the contextual information the computing system is further configured to: determine, based on the device status information, that the user was not interacting with the consumer computing device during playback of the music item but before the user rating was provided; and increase the intensity of the user rating. In some embodiments, the contextual information includes information indicative of what the user was doing in a different application installed on the consumer computing device before the user rating was provided. In some embodiments, the contextual information includes one or more of: data describing how long the user has been listening to music in the current or past listening sessions, other music items the user may have listened to and/or skipped in the current or past listening sessions, a progress indication of how much of the music item was played before the user rating was provided, and/or whether the user skipped around within the music item before the user rating was provided. In an embodiment of the system, the music item recommendation is provided in a web page for display in a web browser application installed on the consumer computing device. In an embodiment of the system, the device status information includes screen display state information indicating whether a screen display associated with the consumer computing device was on within a predetermined period of time before the user rating was provided, or a location of the consumer computing device.

In another embodiment, a computer-implemented method comprises: accessing, from an electronic data store, rating data indicative of a user rating of a music item in association with a music service provided by the electronic catalog, said electronic data store configured to at least store ratings data for one or more music items available from an electronic catalog and contextual information associated with respective ratings, said ratings data submitted from a plurality of users of the electronic catalog; accessing, from the electronic data store, contextual information associated with the user rating, said contextual information indicative of device status information for a consumer computing device used by the user to provide the rating, said contextual information collected at a time when the user provided the rating; determining an intensity of the user rating of the music item based at least in part on the contextual information; determining a music item recommendation for the user based at least in part on the provided user rating and the determined intensity; and providing the music item recommendation to the consumer computing device for presentation to the user. In another embodiment of the method, the music item is a song, an audiobook, or an audiovisual media item. In another embodiment, the intensity of the user rating of the music item is determined at least in part by generating a measure of a degree to which the user modified activity to rate the music item.

In one embodiment, non-transitory physical computer storage comprises computer-executable instructions stored thereon that, when executed by a hardware processor, are configured to perform operations comprising: determining an intensity of a user rating of an audiovisual content item available from a music service based at least in part on contextual information associated with the user rating provided by a user of the music service, said contextual information indicative of status information associated with a consumer computing device used by the user to provide the rating, said contextual information collected at a time when the user provided the rating; determining an item recommendation for the user based at least in part on the provided user rating and the determined intensity; and providing the item recommendation to a consumer computing device for presentation to the user.

In another embodiment of the non-transitory physical computer storage, the contextual information includes one or more of: data indicative of how long the user was listening to or viewing the audiovisual content item before the user rating was provided, other audiovisual items the user may have listened to and/or skipped in the current or past listening or viewing sessions, a progress indicator of how much of the audiovisual content item was played before the user rating was provided, and/or whether the user skipped around within the audiovisual item before the user rating was provided. In another embodiment of the non-transitory physical computer storage, the audiovisual content item is a song, an audiobook, or a video.

In another embodiment, a computer-implemented method comprises: under control of a computing device configured with specific computer-executable instructions: receiving current contextual information associated with playback of a song, the song streamed from a network-based music service, the current contextual information indicative of an activity which a user appears to be performing, the current contextual information detected during playback of the song via a music application installed on a consumer computing device of the user; accessing listening history data associated with the user, the listening history data indicating a plurality of songs previously listened to by the user and historical contextual information associated with playback of at least some of the plurality of songs; determining, based on a comparison of the current contextual information and the historical contextual information, at least one song previously listened to by the user while performing the activity; selecting, from a plurality of candidate next songs, a next song for the user based at least in part on a comparison of the at least one song previously listened to by the user while performing the activity to the plurality of candidate next songs; and providing the next song to the music application installed on the consumer computing device for playback for the user. In another embodiment, the computer-implemented method further comprises analyzing the contextual information to determine an predicted intensity indicative of a degree to which the user may like the next song. In another embodiment, the music application is a mobile application installed on the consumer computing device. In another embodiment, the contextual information includes motion sensor data associated with the consumer computing device indicating whether the device was in motion during playback of the song. In another embodiment of the computer-implemented method selecting the next song for the user is based at least in part on a similarity rating between the song previously listened to by the user while performing the activity to the plurality of candidate next songs.

In another embodiment, a system comprises: an electronic data store configured to at least store user activity data for a plurality of users of an electronic catalog, the user activity data including contextual information associated with user activity with respect to one or more music items available from the electronic catalog accessed by the plurality of users; and a computing system comprising one or more hardware computing devices, said computing system in communication with the electronic data store and configured to at least: receive, from a consumer computing device, current contextual information associated with a user listening to a music item, said current contextual information indicative of an activity in which the user appears to be engaged during playback of the music item on the consumer computing device; access, from the electronic data store, historical user activity information associated with the user, the historical user activity information indicating a plurality of music items previously listened to by the user and historical contextual information associated with playback of at least some of the plurality of music items; determine, based on a comparison of the current contextual information and the historical contextual information, at least one music item previously listened to by the user while engaged in the activity; determine, from a plurality of candidate music item recommendations, a music item recommendation for the user based at least in part on a comparison of the at least one music item previously listened to by the user while engaged in the activity to the plurality of candidate music item recommendations; and provide the music item recommendation to the consumer computing device for presentation to the user.

In one embodiment of the system determining the music item recommendation for the user is based at least in part on a comparison of (1) an intensity of a user rating associated with the music item previously listened to by the user while engaged in the activity to (2) intensity of user ratings associated with the plurality of candidate music item recommendations. In another embodiment, the intensity of the user rating of the music item previously listened to by the user is determined at least in part by a measure of the effort expended by the user to provide a rating for the music item.

In another embodiment, non-transitory physical computer storage comprises computer-executable instructions stored thereon that, when executed by a hardware processor, are configured to perform operations comprising: determining an intensity of a user rating of an audiovisual content item available from a music service based at least in part on contextual information associated with playback of the audiovisual content item, said contextual information indicative of status information associated with a consumer computing device used by the user to during playback of the audiovisual content item; determining an item recommendation for the user based at least in part on the contextual information and the determined intensity; and providing the item recommendation to the consumer computing device for presentation to the user. In another embodiment of the non-transitory physical computer storage the item recommendation is determined based at least in part on historical contextual information and intensity of user ratings for audiovisual content items previously accessed by the user.

For purposes of illustration, the processes are described primarily in the context of a system that recommends music (for example, songs, artists, albums, genres, playlists, and the like) and/or audio-based media items (for example, audiobooks, audio-video content) to users of a music service. As will be apparent, however, the disclosed processes can also be used to recommend other types of items, such as but not limited to any type of catalog item of an electronic catalog, web sites, news articles, blogs, travel destinations, service providers, other users, and events. In addition, the disclosed processes need not be implemented as part of, or in conjunction with, a web site.

Embodiments of the disclosure will now be described with reference to the accompanying figures. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Example Process and Data Flow

Figure 5:
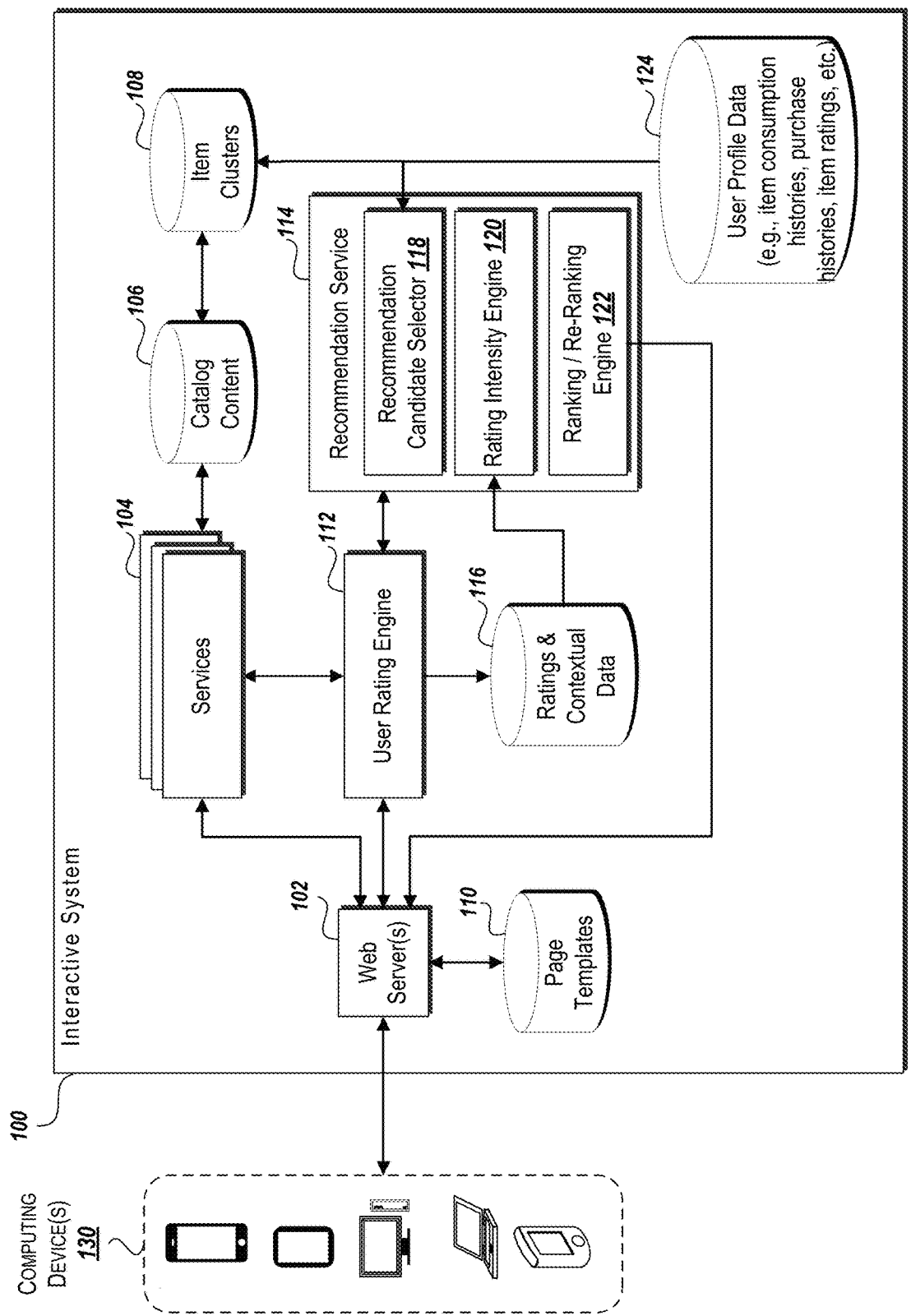
FIG. 5 schematically illustrates an embodiment of an interactive system that implements evaluation of feedback contextual data and feedback intensity rating processes, which may be used to, among other things, provide or improve item recommendations to users.

FIG. 1 is a data flow diagram illustrating how a feedback rating for a song can be augmented by contextual data and used to determine an associated rating intensity to improve a recommendation of a next song item to be played, as implemented by an interactive system, such as the interactive system 100 of FIG. 5. In particular the data flow diagram of FIG. 1 illustrates two hypothetical scenarios of different contextual information can contribute to different rating intensities, which in turn may lead to selection of different candidate songs to be presented next to the user. Of course, many other hypothetical scenarios involving different contextual information may be possible, which can contribute to a wide range of different rating intensities and lead to selection of different candidate songs.

As shown in FIG. 1, a "now playing" song provided by the interactive system 100 may be currently playing on a computing device 130. The now playing song may be provided as part of a playlist or radio station to which the user of computing device 130 is actively or passively listening. The interactive system 100 may have a list or queue of candidate next songs A, B, C . . . N which may be selected as the next song to be provided to and played on the computing device 130 after the now playing song. The list of candidate next songs may be pre-generated and accessed from a repository (such as an item cluster repository 108). For example, the repository may store playlists and radio stations which may include one or more pre-selected songs. The list of candidate songs may be generated dynamically, for example in response to user activity such as skipping the now playing song or giving the now playing song an unfavorable rating.

Each of the candidate next songs A, B, C . . . N may have an associated probability or likelihood of being selected as the next song to be provided. For ease of illustration, each candidate next song A, B, C . . . N shown in FIG. 1 initially has an associated probability of 1× to indicate that in the current state each candidate song is equally likely to be selected as the next song. However, in other scenarios the associated probabilities may vary based on a wide variety of criteria, including but not limited to attributes each candidate song may have in common with the now playing song; attributes each candidate song may have in common with other songs which the user has previously rated (favorable or unfavorable); attributes each candidate song may have in common with other preferences associated with the user (e.g., whether the user prefers songs of a certain genre, beats per minute ("BPM"), artist, and so on).

As the two illustrated scenarios in FIG. 1 demonstrate, the associated probability of being selected as the next song may be modified based on feedback or rating information received from the user. In one base case scenario not illustrated, the associated probabilities may be updated based simply on whether the user liked (thumbs up) or disliked (thumbs down) the now playing song, or on whether the user skipped the now playing song without providing a rating or other explicit feedback. This basic information may be used to interpret the user's musical taste or preference in order to inform the decision about which candidate next song should be selected and provided to the user. For example, suppose the now playing song is associated with the genre "country," and the user skips the song or provides a thumbs down rating. If the candidate next song A is also associated with the genre "country," then the interactive system 100 may reduce the probability of candidate next song A being selected as the next song, and/or increase the relative probability of other candidate next songs which are not associated with the genre "country" as being selected as the next song.

However, additional contextual information may be useful to fine-tune or otherwise improve the accuracy of the selected next song being one which the user will like. For example, additional contextual information associated with the user's feedback or rating may be detected or determined by the computing device 130 (and/or by a music application running on the computing device 130) and provided with the feedback or rating to the interactive system 100. In scenario 1 of FIG. 1, the contextual information indicates that when (or shortly before) the user provided the feedback or rating for the now playing song, the computing device 130 had been in a state of motion (e.g., as may be detected by an accelerometer, motion detector, or location service on the computing device), and further that the computing device 130 was in a "locked" state (e.g., screen display turned off and/or access to applications on the device disabled). The contextual information may further indicate that in order to provide the rating, the user unlocked the computing device, opened the music application, and rated the now playing song. These data points may indicate that the user was in transit and not actively using the device, and that the user felt intensely enough about the now playing song to take the extra steps to interrupt their other activity, unlock the device, go the music app, and rate the song. As such, the interactive system 100 (e.g., via the rating intensity engine 120) may evaluate these data points and determine a degree of intensity associated with the rating.

In scenario 1 of FIG. 1, a rating intensity of 4× has been determined, although any other type of value or weighting may be used depending on the implementation. The rating intensity may then be used to rank or re-rank the list of candidate songs, for example by adjusting the associated probability of being selected as the next song based at least in part on the determined rating intensity. The ranking or re-ranking may be a simple multiplier or involve more complex calculations based on criteria or attributes associated with each candidate song, including either shared or differing attributes each candidate song may have relative to the now playing song. For example, suppose that the now playing song is a pop song which the user has rated favorably (e.g., thumbs up, five stars, etc.); and that candidate next song B is also a pop song, while candidate next song C is a dance song (e.g., related to the pop genre), and candidate next song A is a rock song. The rating intensity may indicate that the user has a strong preference for pop songs, and thus candidate next song B may receive a higher probability boost to increase the likelihood of being selected as the next song for the user, and candidate next song C may receive a slight probability boost due to its relative affinity with the pop genre, and candidate next song A may not receive either a boost or a downgrade for its absolute probability due to a neutral affinity with the pop genre. The process may of course have the opposite effect if the user has rated the now playing song unfavorably.

Figure 2:
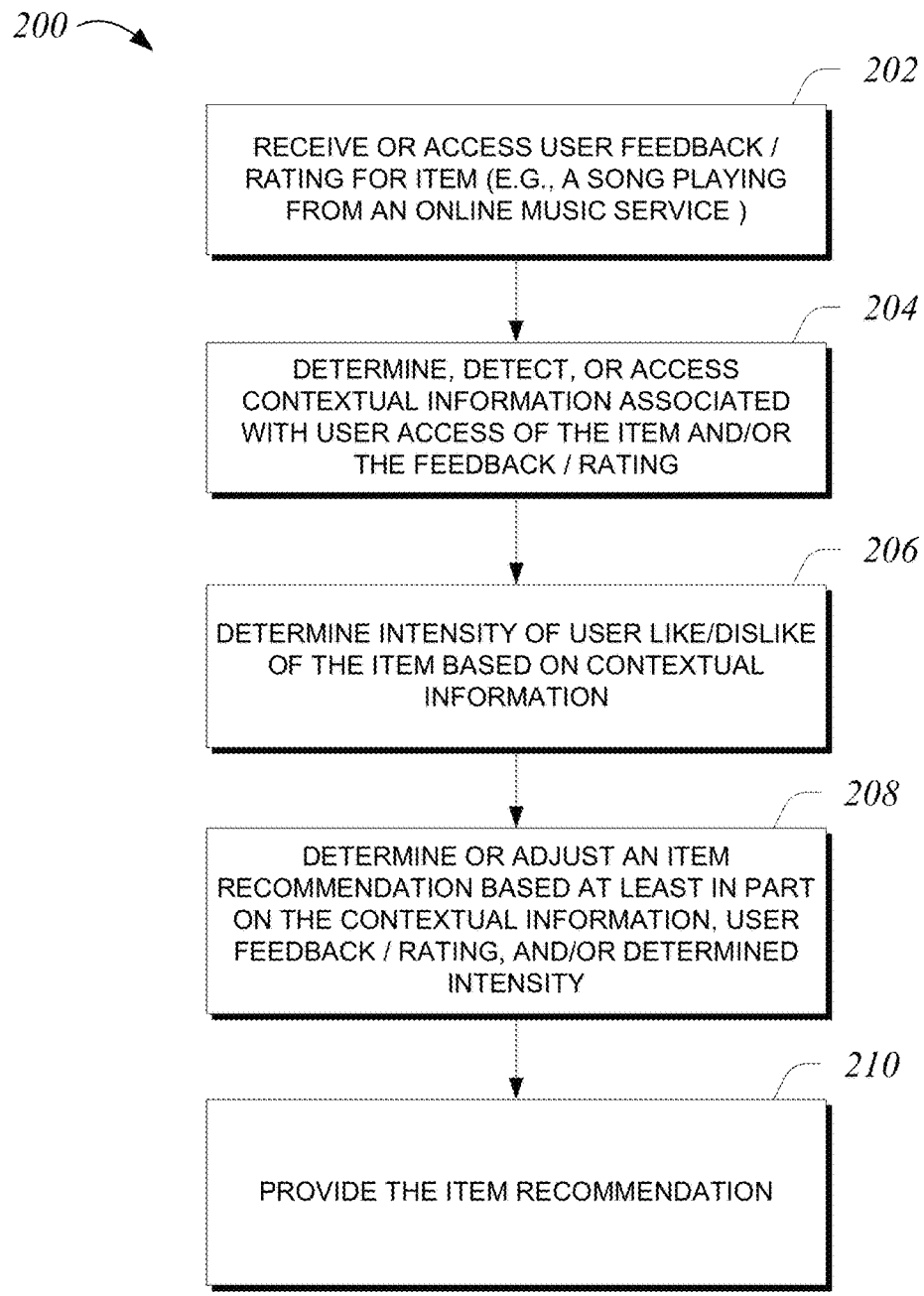
FIG. 2 is a flow diagram of an example method for determining an intensity of user feedback for an item (such as a music item or audio-based media content) based at least in part on contextual data (such as user and/or device activity), and generating an item recommendation based on the determined intensity, as implemented by an interactive system, such as the interactive system of FIG. 5.

In scenario 2 of FIG. 2, the contextual information indicates that when (or shortly before) the user provided the feedback or rating for the now playing song, the computing device 130 had not been in a state of motion, and further that the computing device 130 was in an unlocked state and actively being used by the user (e.g., screen display is turned on and/or access to applications on the device enabled). The contextual information may further indicate that in order to provide the rating, the user switched to the music application, and rated the now playing song. These data points may indicate that the user was actively using the device, and that the user felt intensely enough about the now playing song to take the extra steps to interrupt their other activity, switch to the music app, and rate the song. As such, the interactive system 100 (e.g., via the rating intensity engine 120) may evaluate these data points and determine a degree of intensity associated with the rating. However, these data points may indicate a lower intensity of the user's feeling about the now playing song than the data points in scenario 1, since the user had to take fewer active steps to provide the rating in scenario 2. As a further example, if the user was already actively using the music application at the time the rating was provided, the associated intensity may be relatively less than the intensity associated with scenario 2.

In scenario 2 of FIG. 1, a rating intensity of 2× has been determined and used to rank or re-rank the list of candidate songs. For example, suppose that the now playing song is a song by the artist "Calvin Harris" which the user has rated favorably (e.g., thumbs up, five stars, etc.); and that candidate next song C is also a song by Calvin Harris, while candidate next song A is a song by Lorde, and candidate next song B is a song by Madonna. The rating intensity may indicate that the user has a strong preference for songs by Calvin Harris, and thus candidate next song C may receive a probability boost to increase the likelihood of being selected as the next song for the user, and candidate next songs A and B may not receive either a boost or a downgrade for their absolute probability due to a neutral affinity with songs by Calvin Harris. The process may of course have the opposite effect if the user has rated the now playing song unfavorably.

Although FIG. 1 focuses primarily on the example scenario in which contextual data associated with a user's feedback rating for a now playing song may be used to determine an associated rating intensity to improve a recommendation of a next song item to be played, in other embodiments contextual data may be used independently of the user's feedback rating of the now playing, or even if no user feedback rating of the now playing song is provided. For example, contextual data associated with playback of a now playing song or, more generally, associated with execution of the music application, may be received by the interactive system 100, with or without an associated user feedback rating. The interactive system 100 may then access and analyze historical listening data associated with the user, which may include in some instances historical contextual data and/or historical feedback or ratings for previously listened to songs. The historical contextual data and/or historical feedback or ratings for previously listened to songs may be compared, for example, to the current contextual data in order to determine a projected intensity of like or dislike for one or more candidate songs on the list.

One non-limiting but specific example to illustrate this aspect is as follows: A user may be running or jogging while listening to music, an activity which the interactive system 100 may determine based on contextual data associated with activity (e.g., the user's device is in motion at an apparent running pace, the user's device is jostling around which may indicate running or other cardiovascular activity by the user, the speed at which the device is moving which may be based on GPS data, and so on). Further, the interactive system 100 may determine, based on the user's historical listening behavior and habits, including a history of songs the user has rated positively in the past while running or jogging, that certain of the one or more candidate songs are more likely to be positively received by the user. Such candidate songs may then receive a "boost," or the likelihood of being selected for the next playing song may be increased similarly to the process described above with respect to the rating intensity multiplier.

In some embodiments, contextual information associated with the user's activity after listening to a song or providing a rating or feedback may also be taken into consideration when determining an associated intensity. For example, if a user gives a favorable rating of a song while running and then at some later time purchases the song or the album, the determined intensity associated with the rating may be increased, as the purchase action may reinforce the user's level of interest in the song. Thus, although many of the examples described herein focus on contextual information at or just prior to the time a rating is given, these examples may apply as well to scenarios in which contextual information is analyzed over a time range or period of interest (e.g., 30 minutes after the user finishes running) and/or associated with particular events (e.g., the user purchasing the song or album may affect the determined intensity even if the purchase occurs days or weeks after the rating was given). In some cases the contextual information may itself be used to determine the time range or period—for example, contextual information may indicate that the user appeared to be running but stopped, indicating the time period of interest may be ended or ending soon.

Example Method of Using Rating Contextual Information to Determine Rating Intensity FIG. 2 is a flow diagram of an example process 200 for determining an intensity of user feedback for an item (such as a music item or audio-based media content) based at least in part on contextual data (such as user and/or device activity), and generating an item recommendation based on the determined intensity, as implemented by an interactive system, such as the interactive system 100 of FIG. 5.

At block 202, the process 200 may receive or access user feedback or a rating for an item, such as a "now playing" song playing from a music service (which may be provided, for example, by the interactive system 100). The user feedback or rating may be received from a computing device 130 that is in communication with the interactive system 100 and causing playback of the now playing song. In one embodiment, the user feedback or rating may be accessed from a repository (e.g., the ratings and contextual data repository 116 of FIG. 5). For example, in some scenarios, the user feedback or rating may be associated a stored history of songs listened to, skipped, and/or explicitly rated by the user. Thus, the process 200 may be applied either in the context of a "now playing" song, in the context of songs previously played, or both in some combination. In some embodiments, an explicit user feedback or rating may not be accessed at all, such as in instances in which recommendations are generated based on current and historical contextual information and optionally historical intensity ratings, and thus block 202 may be skipped.

At block 204, the process 200 determines, detects, or accesses contextual information or data associated with the user access of the item and/or associated with the feedback or rating. The contextual information may be received from the computing device 130 with the user feedback or rating, or accessed from the ratings and contextual data repository 116. The contextual information may be detected by the computing device 130 and/or by a music application (which may be provided in association with the interactive system 100 in order to enable access to the music service) running on the computing device 130. The computing device 130 and/or music application may be configured to collect user and/or device activity and state information at the approximate time or period of time when the item is presented to the user (e.g., during playback of a music item) and/or when the user feedback or rating is provided by the user, and provide the collected user and/or device activity and state information in a bundle of contextual information with the user feedback or rating.

At block 206, the process 200 determines an intensity of the user's like or dislike of the item based on the contextual information or data. This may include for example determining an intensity of the user feedback or rating. The intensity may be determined based on an analysis of various data points included in the contextual information. The scenarios illustrated and described with reference to FIG. 1 herein provide a couple of examples of how the intensity may be determined or calculated. However, there may be a potentially large number of data points available in the contextual information which may be analyzed to provide a high degree of granularity and nuance associated with, for example, the user feedback, which can contribute to a wide spectrum of determined intensities.

In some embodiments, the intensity may also be determined based in part on historical user feedback and contextual information collected and analyzed over time for the individual user. For example, an individual user's intensity ratings may be determined based on past trends, such as prior feedback and contextual information and associated determined intensities for the user. Thus, certain factors or combinations of feedback and contextual information for the user may indicate certain levels of intensity which may be consistent over time and result in improved item (e.g., next song) recommendations for the user. Individually tailored intensity determinations may be beneficial in some scenarios since user preferences, and in particular musical tastes and preferences, tend to be subjective and individualized, and some users may be more enthusiastic about music than others (and thus may have relatively higher intensity of feelings of like or dislike for songs, genres, artists, etc.). Further, in some instances wherein current contextual data for a current listening session is available but an explicit rating or feedback for the current song has not been provided, the intensity may be determined as a predicted or projected intensity based on the historical user feedback and contextual information. This predicted or projected intensity may then be used to refine selection of the next item recommendation, even if a user has not rated or provided feedback for the current song.

In some embodiments, the intensity may also be determined based in part on user feedback and contextual information collected and analyzed over time for an aggregate or group of users. For example, the interactive system 100 may collect and analyze aggregate feedback and/or ratings, contextual information, and/or determined intensities over time to generate overall user trends and intensities which may be associated with particular combinations of feedback, ratings, and contextual information. These trends may then be stored and accessed (e.g., from the ratings and contextual data repository 116) and may be used to generate an initial or baseline intensity rating for a particular combination of user feedback and contextual information. For example, the interactive system 100 may determine that users overall have a certain intensity of feeling for songs which are rated favorably when the user is passively listening and stops or interrupts their other activity to provide a rating, while users overall have a relatively lesser intensity of feeling for songs which are rated favorably when the user is actively listening and provides a rating. The initial or baseline intensity rating may then be modified or adjusted for a particular user based on, for example, the particular contextual information associated with the particular user feedback being evaluated and/or based on any user trends associated with the particular user.

At block 208, the process 200 determines or adjusts an item recommendation, such as a selected next song for the user, based at least in part on the contextual information, user feedback or rating, and/or the determined intensity. For example, as illustrated and described with reference to the scenarios in FIG. 1, a list or queue of candidate next songs may be generated and/or adjusted based on the user feedback or rating and the determined intensity. The determination or adjustment of the item recommendation may also involve, for example, giving different amounts of weight to different rating events of the user, such that the interactive system may give more weight to the user's high intensity ratings than low intensity ratings. Or, in another embodiment, the item recommendation may be determined based on a comparison of current contextual information to historical contextual information associated with items previously consumed or played by the user, which may be based in part on historical intensity ratings associated with those previously consumed items. For example, if the current contextual information indicates the user is running, then the item recommendation may be determined based on other items the user listened to and had higher intensity ratings while running at a previous time.

At block 210, the process 200 provides the item recommendation. For example, the selected next song may be provided to the computing device 130 (e.g., via the music application running on the computing device 130), which may cause display and/or playback of the next song for the user. The user interfaces shown in FIGS. 3 and 4 illustrate a couple of examples of music application user interfaces which may be configured to display the next song (and/or other item recommendation) in association with playback of the next song on the computing device 130.

Example User Interfaces

Figure 3:
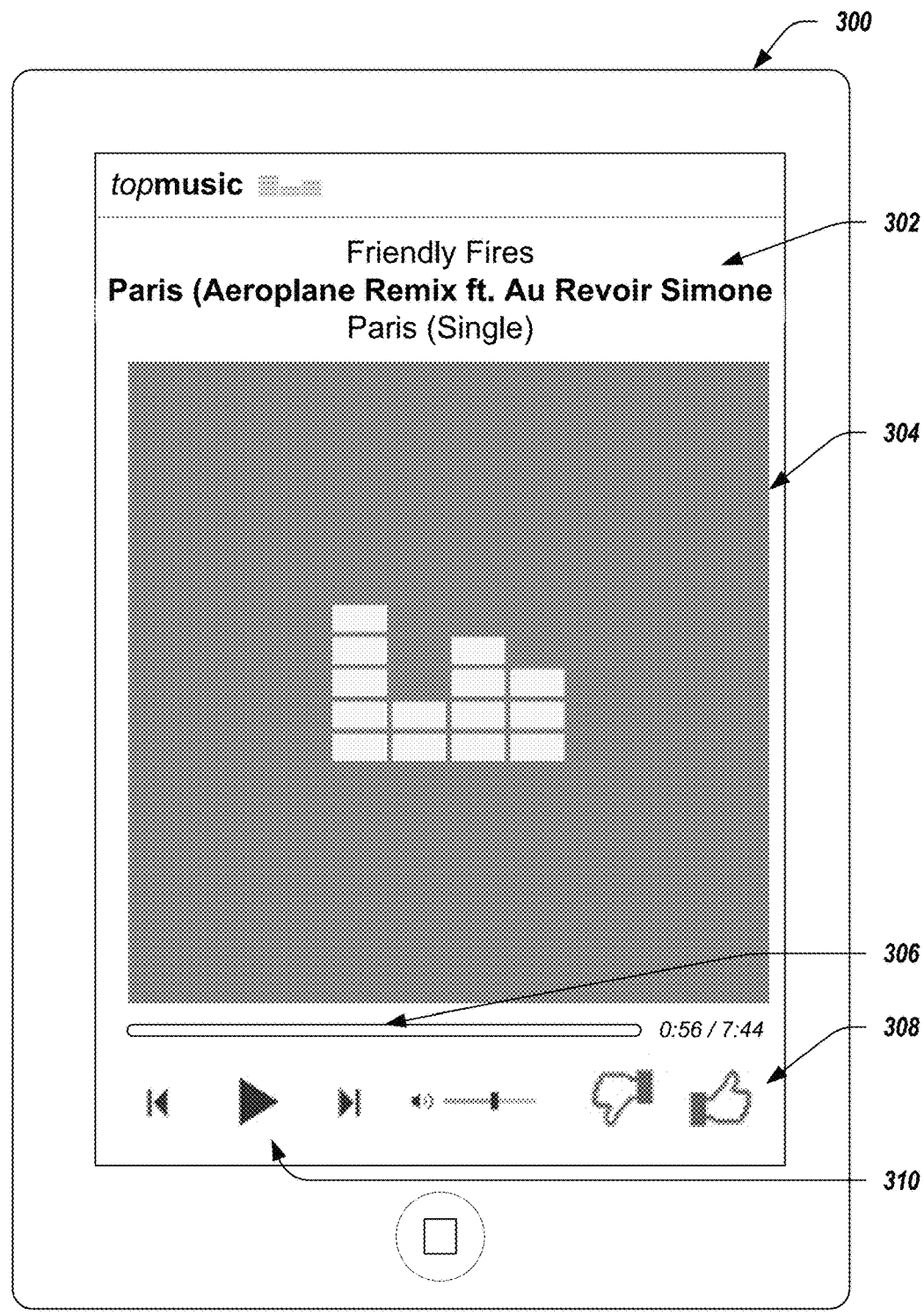
FIG. 3 is a pictorial diagram of an example user interface that illustrates a mobile application for interacting with a network-based music service, including a user-selectable feedback option for a listener to rate a "now playing" song, involving an interactive system, such as the interactive system of FIG. 5.
Figure 4:
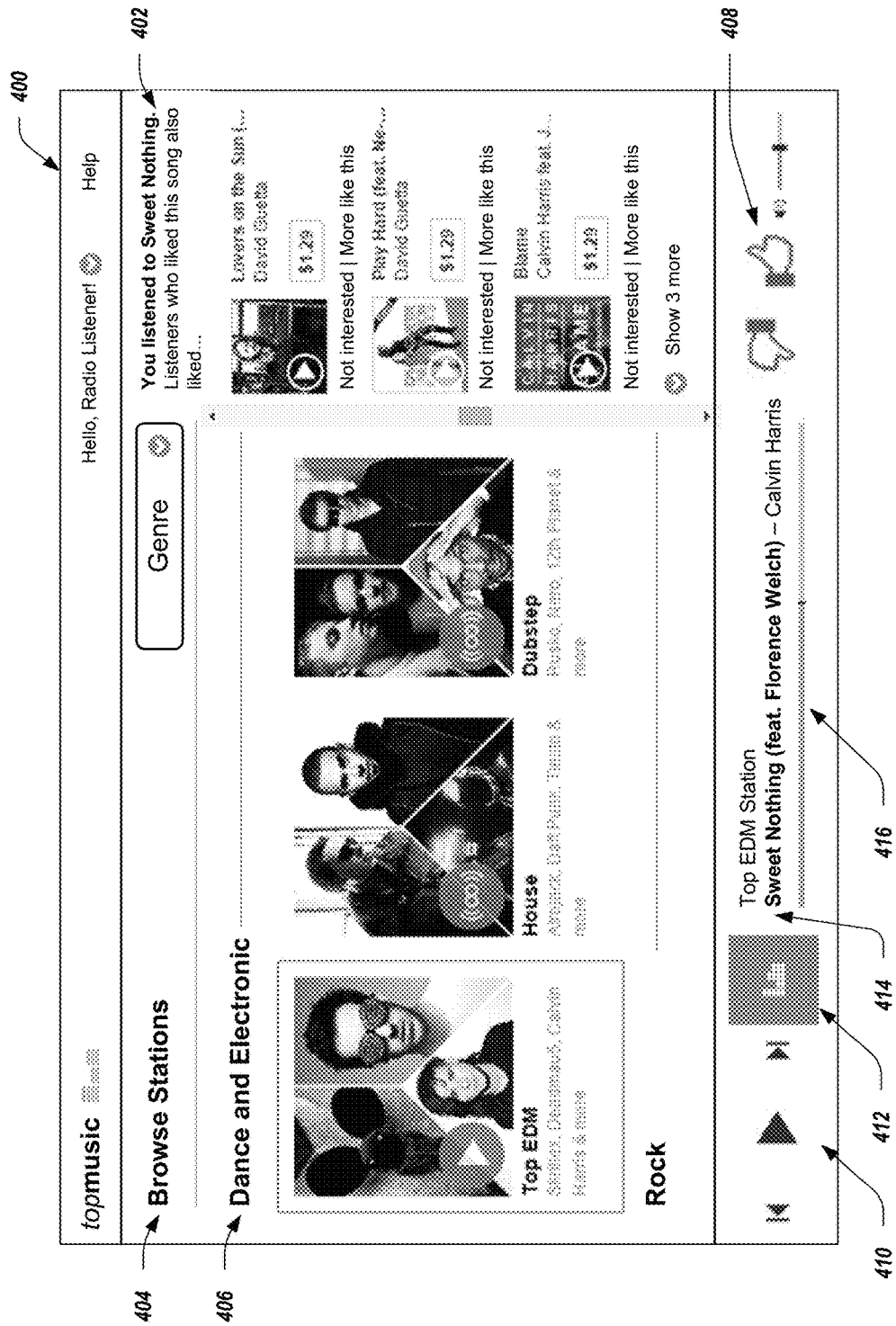
FIG. 4 is a pictorial diagram of an example user interface that illustrates a web-based application for interacting with a network-based music service, including a user-selectable feedback option for a listener to rate a "now playing" song, involving an interactive system, such as the interactive system of FIG. 5.

FIGS. 3 and 4 illustrate sample user interfaces that may be generated by or used with an interactive system, such as the interactive system 100 of FIG. 5. In various embodiments, each of the user interfaces shown in FIGS. 3 and 4 may be presented as a web page, as a mobile application display, as a stand-alone application display, as an email message, as a text message (for example, a short message service (SMS) or a multimedia messaging service (MMS) message) or by other communication means. In other embodiments, analogous interfaces may be presented using audio or other forms of communication. In an embodiment, the interfaces shown in FIGS. 3 and 4 are configured to be interactive and respond to various user interactions. Such user interactions may include clicks with a mouse, typing with a keyboard, touches, and/or gestures on a touch screen, voice commands, and/or the like.

FIG. 3 illustrates an example user interface 300 for a music application that presents a now playing song and associated user interface controls, involving an interactive system, such as the interactive system 100 of FIG. 5. The example user interface 300 is presented as it may appear, for example, in an application running on a portable electronic device. The application interfaces may be generated by the web server 106 (FIG. 5) using a repository of page templates 110, or by a music application, installed on the computing device 130, that is provided in association with the music service provided by the interactive system 100.

As illustrated at user interface feature 302, information about a now playing song is displayed, including for example an artist name, a song title, and an album title. User interface feature 304 may display an album cover or other graphic associated with the now playing song. User interface feature 306 includes a song progress indicator (e.g., a horizontal bar which progressively fills up as the song progresses), which may also include a time progress indicator showing time elapsed and total time (or time remaining) for the now playing song. In certain embodiments the song progress indicator may be a user-selectable control such that the user can interact (e.g., touch, click, etc.) with a segment of the song progress indicator to skip ahead to the associated part of the now playing song.

User interface feature 308 presents the user with user-selectable feedback or rating user interface controls which the user may select to provide feedback or a rating for the now playing song. As illustrated in user interface 300 the feedback or rating control may comprise a thumbs up icon and a thumbs down icon by which the user can indicate a feeling of like or dislike of the now playing song. Other types of feedback or rating controls may be provided with or instead of the thumbs up and thumbs down icons, including but not limited to: a user control to rate the song using a number of stars; a plus icon and a negative icon to indicate positive or negative feedback; or other types of yes/no, good/bad, and/or scaled feedback or ratings. When the user provides feedback or a rating via the user interface feature 308, the computing device 130 and/or the music application running on the computing device 130 may detect the feedback or rating as well as other contextual information and provide the feedback or rating and the contextual information to the interactive system 100 for processing and analysis as described herein.

When the user provides feedback or a rating via the user interface feature 308, the computing device 130 and/or the music application running on the computing device 130 may detect the feedback or rating as well as other contextual information and provide the feedback or rating and the contextual information to the interactive system 100 for processing and analysis as described herein. Once the interactive system 100 analyzes the feedback and the contextual information, determines an associated intensity, and generates a next song to be played, the next song may be provided to the computing device 130 for presentation (including playback) to the user, and the user interface 300 may be refreshed or updated to display the next song as the new now playing song.

User interface feature 310 presents the user with various user-selectable controls to control playback of music in the music application, including a previous song/skip one track back button, a play/pause button, a next song/skip one track ahead button, and a volume controller (e.g., illustrated here as a horizontal slider control). Other playback controls may be included such as controls to skip back or ahead within the now playing song, controls to open various dialog boxes presenting options for the user to select particular songs, playlists, radio stations, and the like.

Other variations on the user interface 300 may also be possible. For example, certain user interface features shown in user interface 300 may be omitted, displayed or arranged differently (e.g., user interface feature 310 may appear at the top, user interface feature 308 may be arranged vertically on either side of user interface feature 304, etc.).

FIG. 4 illustrates an example user interface 400 that presents a music page, involving an interactive system, such as the interactive system 100 of FIG. 5. The example user interface is presented as it may appear, for example, in a web browser or standalone application as a web page. The web page may be generated by the web server 106 (FIG. 5) using a repository of page templates 110.

User interface feature 402 presents the user with one or more item (e.g., music) recommendations based on a song (or songs) from the user's listening history and/or based on items other users who liked or listened to the same song (or songs) have also liked. The item recommendations may include options for the user to indicate he is not interested, or to view more similar item recommendations. The item recommendations presented at user interface feature 402 may be generated, for example, using any of the item recommendation processes described herein, including generating the item recommendations based on contextual data associated with the user's listening history and/or intensity of user feedback for songs rated by the user. User interface feature 404 presents the user with options to browse stations available from the music service, including a button and dropdown menu by which the user can browse available stations and select one for listening. User interface feature 406 presents the user with information about the currently selected and playing station (e.g., "Top EDM" under the "Dance and Electronic" genre), as well as information about other stations which may be available from the music service. Each station may indicate one or more artists which may be played on the station in order to provide the user with a general idea of the representative type of music that will be played on the respective station.

User interface feature 408 presents the user with user-selectable feedback or rating user interface controls which the user may select to provide feedback or a rating for the now playing song. As illustrated in user interface 400 the feedback or rating control may comprise a thumbs up icon and a thumbs down icon by which the user can indicate a feeling of like or dislike of the now playing song. As with user interface 300, other types of feedback or rating controls may be provided with or instead of the thumbs up and thumbs down icons.

When the user provides feedback or a rating via the user interface feature 408, the computing device 130 and/or the music application running on the computing device 130 may detect the feedback or rating as well as other contextual information and provide the feedback or rating and the contextual information to the interactive system 100 for processing and analysis as described herein. Once the interactive system 100 analyzes the feedback and the contextual information, determines an associated intensity, and generates an item recommendation (e.g., a next song to be played), the recommended item content (e.g., the next song) may be provided to the computing device 130 for presentation (including playback) to the user, and the user interface 400 may be refreshed or updated to display the recommended item content.

The user interface 400 also includes many similar user interface features as those provided in user interface 300, including user interface feature 410 for the user to control music playback, user interface feature 412 presenting an album cover for the now playing song, user interface feature 414 presenting information about the now playing song (e.g., the currently selected or playing station, song title, artist), and user interface feature 416 presenting a song progress indicator.

Example System

FIG. 5 schematically illustrates an embodiment of an interactive system that implements analysis and evaluation of contextual information associated with user feedback and ratings, and rating intensity determination processes, which may be used to, among other things, provide or improve item recommendations to users.

FIG. 5 schematically illustrates one embodiment of an interactive system 100 that implements the above and other features described herein. The interactive system 100 may be implemented as a computerized system that comprises multiple programmed computing devices (e.g., web server machines, application servers, storage servers, load balancers, etc.) that communicate over one or more networks. The interactive system 100 hosts a web site that provides functionality for users to browse an electronic catalog of items that are available for purchase. The items represented in the catalog may include, for example, physical products, music or video downloads, electronic book downloads, software applications, magazine subscriptions, mobile service plans, and other types of items that can be purchased. Although described in the context of a web site, the inventive features described herein can also be implemented in other types of interactive systems, including interactive television systems. Further, although described in the context of products that are available for purchase or consumption, the disclosed features are also applicable to other types of items, including services, news articles, blogs, web sites, and television shows.

The web server 102, which may include any number of physical servers, dynamically generates web pages in response to requests from the user computing devices 130 (e.g., personal computers, laptops, portable computing devices, mobile phones, electronic book readers, PDAs, tablets, etc.). The web pages can be generated using a repository of web page templates 110, using data retrieved from a set of services 104. The types of services 104 can vary widely, and may include, for example, a catalog service that returns catalog data for particular items, a search service that processes search queries including free-form search strings submitted by users, a tag service that allows users to tag items, and a transaction processing services that processes purchases and/or other types of transactions.

The interactive system 100 also includes a repository of catalog content 106. The catalog content may include, for example, product images, product descriptions, user ratings, and reviews of particular products, price and availability data, seller data, etc. The item information in this repository may be viewable by end users through a browsable electronic catalog in which each item may be described in association with a corresponding network page, which can be referred to as an item detail page. Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree, and/or using various other navigation techniques. An item detail page may be associated with one or more uniform resource identifiers ("URIs") that may be interpreted by a browser or other program operating on a computing device in order to present the item details, request the page information from a server or other system, or the like.

As shown in FIG. 5, the interactive system 100 also includes a repository of ratings and contextual data 116 may comprise data describing ratings and/or feedback which users have submitted to the interactive system 100 during one or more browsing sessions and/or music listening sessions over a period of time. The ratings and contextual data 116 may also comprise contextual information associated with the ratings and/or feedback, including any type of contextual information as described herein. The ratings and contextual data 116 may also comprise contextual information associated with browsing sessions and/or music listening sessions without necessarily being associated with ratings and/or feedback. For example, for a particular user who does not provide ratings or feedback, contextual information associated with the particular user's historical music listening behavior may still be stored in the ratings and contextual data 116.

The interactive system 100 also includes a user rating engine 112 that receives and processes user feedback, ratings, and contextual information from computing devices 130. The user feedback, ratings, and contextual information may be stored in the repository of ratings and contextual data 116. The interactive system 100 also includes a recommendation service 114 that performs and provides the item recommendations services described herein, including accessing and/or generating recommendation candidates and ranking (or re-ranking) the candidates based at least in part on determined ratings intensities, and/or contextual data associated with user feedback and ratings.

The recommendations service 114 may include a recommendation candidate selector 118 that may be configured to generate or select one or more recommendation candidates to recommend to the user based on the user profile data 124 and/or item cluster data repository 108. The recommendation candidates may have associated scores indicating a relative strength of relevance to the user. For example, the recommendation candidate selector 118 may select the N most highly scored candidates to recommend. Alternatively, the recommendation candidate selector 118 may select a different subset. For example, in some cases it can be beneficial to show recommendations that are not determined to be the best in order to provide fresh recommendations to the user, among other reasons. Item clusters stored and accessed from the repository of item clusters 108 may include items which have been identified as being potentially related or relevant based on a variety of criteria. For example, item clusters may include music and other audio-based content items which may be grouped together in a playlist, bundled together for potential selection for playback on a radio station, or otherwise associated based on similar attributes or characteristics such as genre, artist, album, BPM, tags, and other attributes.

The recommendations service 114 may also include a rating intensity engine 120. The rating intensity engine 122 may be configured to, for example, access or retrieve ratings and contextual data from the ratings and contextual data repository 116, and analyze the ratings and contextual data to determine intensities associated with respective ratings. For example, the recommendations service 114 may be configured to execute certain aspects of the process 200 described herein, such as the process performed at block 206.

The recommendations service 114 may also include a ranking (re-ranking) engine 122. The ranking engine 122 may be configured to, for example, access or retrieve determined intensity data for one or more of the recommendation candidates. The ranking engine 122 may use the determined intensities to update or re-rank an already-ranked set of items, or can rank the items if not already ranked (e.g., to generate or determine an initial ranking of the set of items). For example, a particular candidate recommendation with a relatively lower score or ranking after the initial ranking is generated may receive a ranking "boost" or a ranking "downgrade" in response to the intensity data indicating that the user may have a more intense feeling or response to items similar to the particular candidate recommendation. Thus, the determined intensity data may be an additional input to rank or re-rank the recommendation candidates. This may be of benefit to the user receiving the provided recommendations, as the user may be interested in items that are similar to items for which they previously had an intense positive reaction, or less interested in items that at similar to items for which they previously had an intense negative reaction.

User profile data store 124 may store, for example, item preference data reflective of actions performed by a user. These actions might include, for example, purchasing items, rating items, adding items to the user's wish list, providing data on the user's friends, tagging items, searching for items, and the like. The item preference data may include browse history data (e.g., data on user searches, clicks, a category browsed by the user and the like), purchase history data, friends' data, tags data, and many other types of data.
Other In some embodiments, the interactive system 100 can be configured differently than shown in FIG. 5. Many variations and alternatives are possible, and no single component or group of components is essential or required to be present in every embodiment of the interactive system 100.

The interactive system 100 may also include functionality and components (not shown) for enabling users to perform various other types of functions, including but not limited to the following: (1) purchasing items selected from the electronic catalog, (2) creating wish lists of items selected from the catalog, and searching for and viewing the wish lists of other users, (3) conducting keyword searches for specific catalog items, (4) browsing the catalog using a browse category-based item browse tree, (5) creating personal profiles that are viewable by other users, (6) posting items for sale in the electronic catalog, (7) tagging specific catalog items and (8) posting customer reviews, recommendations and ratings of particular catalog items.

The various components shown in FIG. 5 may be implemented in an appropriate combination of hardware and software. For example, the web server 102 may be implemented using physical servers (with processors, memory, etc.) that are programmed with executable program code to respond to display page requests by generating and returning web pages. As a further example, the web server 102 could be implemented by virtual machines instances existing on one or more physical computing devices. The recommendation candidate selector 118, the rating intensity engine 120, and the ranking/re-ranking engine 122 may similarly be implemented using programmed physical servers, virtual machine instances, or general purpose computers.

In the environment shown in FIG. 5, a user of the interactive system 100 may utilize a user computing device 130 to communicate with the interactive system 100. The communication may occur via a communication network, such as the Internet or other communications link. Those skilled in the art will recognize that the user computing device 130 may be any of a number of computing devices that are capable of communicating over a network. For example, the user computing devices can include, but are not limited to, a laptop, personal computer, personal digital assistant (PDA), hybrid PDA/mobile phone, mobile phone, electronic book reader, digital media player, tablet computer, gaming console or controller, kiosk, augmented reality device, other wireless device, set-top or other television box, and the like.

The network may be any wired network, wireless network or combination thereof. In addition, the network may be a personal area network, local area network, wide area network, cable network, satellite network, cellular telephone network, etc. or combination thereof. In addition, the network may be a personal area network, local area network, wide area network, cable network, satellite network, cellular telephone network, etc. or combination thereof. In addition, the network may be a personal area network, local area network, wide area network, over-the-air broadcast network (e.g., for radio or television), cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or some other type of wireless network. The network can use protocols and components for communicating via the Internet or any of the other aforementioned types of networks. Protocols and components for communicating via the Internet or any of the other aforementioned types of communication networks are well known to those skilled in the art and are not described in more detail herein.

The interactive system 100 is depicted in FIG. 5 as operating in a distributed computing environment including several computer systems that are interconnected using one or more computer networks. The interactive system 100 may have a fewer or greater number of components than are illustrated in FIG. 5. Thus, the depiction of the interactive system 100 in FIG. 5 should be taken as example and not limiting to the present disclosure. For example, the interactive system 100 could implement various Web services components and/or peer-to-peer network configurations to implement at least a portion of the processes described herein.

The interactive system 100 is also responsible for providing communication with various user devices, such as user computing device 102. The communication provided by the interactive system 100 may include generating text and/or graphics, possibly organized as a user interface using hypertext transfer or other protocols in response to information inquiries received from the various user devices. The interactive system 100 may obtain information on available goods and services from one or more data stores, such as catalog content repository 106, as is done in conventional electronic commerce systems. In certain embodiments, the interactive system 100 may also access item data from other data sources, either internal or external to interactive system 100.

CONCLUSION

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various example logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   under control of specific computer-executable instructions:

generating current contextual information associated with playback of a song being streamed from a network-based music service, wherein generating current contextual information comprises:
monitoring information detected via sensors of a consumer computing device, and
determining, based on the monitored information, information indicative of a physical activity being performed by a user of the consumer computing device, and wherein the current contextual information is generated during playback of the song via a music application installed on the consumer computing device of the user;

identifying, based on the generated current contextual information, the physical activity being performed by the user;

determining one or more songs previously played by the user while performing the identified physical activity;

ranking a plurality of candidate songs, the candidate songs comprising, at least, the determined songs, and the determined songs receiving boosts in the ranking based on being played by the user while performing the identified physical activity;

causing a next song selected based on the ranking to be played by the music application.

2. The computer-implemented method of claim 1, further comprising analyzing the contextual information to determine a predicted intensity indicative of a degree to which the user may like the next song.

3. The computer-implemented method of claim 1, wherein the music application is a mobile application installed on the consumer computing device.

4. The computer-implemented method of claim 1,
wherein monitoring information obtained from sensors comprises one or more of:
obtaining motion sensor data detected via an accelerometer of the consumer computing device, the motion sensor data indicating whether the device was in motion during playback of the song, or
obtaining location data detected via a global positioning system sensor;
and wherein for a particular physical activity associated with running, determining information indicative of the particular physical activity comprises determining, based on the motion sensor data, whether the device was in motion corresponding to running and/or determining, based on the location data, whether a speed associated with the consumer computing device corresponds to running.

5. The computer-implemented method of claim 1, wherein selecting the next song for the user is based at least in part on a similarity rating between the song previously listened to by the user while performing the physical activity to the plurality of candidate next songs.

6. A system comprising:
an electronic data store configured to at least store user activity data for a plurality of users of an electronic catalog, the user activity data including contextual information associated with user activity with respect to one or more music items available from the electronic catalog accessed by the plurality of users; and
a computing system comprising one or more hardware computing devices, said computing system in communication with the electronic data store and configured to at least:
receive, from a consumer computing device, current contextual information associated with a user listening to a music item, said current contextual information identifying an activity engaged in by the user during playback of the music item on the consumer computing device, wherein the consumer computing device generates the current contextual information based on monitoring information detected via sensors of the consumer computing device;
access, from the electronic data store, historical user activity information associated with the user, the historical user activity information indicating a plurality of music items previously listened to by the user and historical contextual information associated with playback of at least some of the plurality of music items,
wherein the historical contextual information indicates respective activities performed by the user during playback of the at least some of the music items;
determine, based on a comparison of the identified activity and the historical contextual information, one or more music items previously played by the user while engaged in the activity;
ranking a plurality of candidate music item recommendations, the candidate music item recommendations comprising, at least, the determined music items, and the determined music items receiving boosts in the ranking; and
provide a music item recommendation selected based on the ranking for presentation via the consumer computing device.

7. The system of claim 6, wherein the music item is a song, an audiobook, or an audiovisual media item.

8. The system of claim 6, wherein the contextual information is received from a music application installed on the consumer computing device.

9. The system of claim 6, wherein the music item is streamed to the consumer computing device from a network-based music service as part of a radio station or a playlist.

10. The system of claim 6, wherein the contextual information includes information indicative of what the user was doing in a different application installed on the consumer computing device during playback of the music item.

11. The system of claim 6, wherein ranking the candidate music item recommendations is based at least in part on a comparison of (1) an intensity of a user rating associated with the music item previously listened to by the user while engaged in the activity to (2) intensity of user ratings associated with the plurality of candidate music item recommendations.

12. The system of claim 11, wherein the intensity of the user rating of the music item previously listened to by the user is determined at least in part by a measure of the effort expended by the user to provide a rating for the music item.

13. The system of claim 6, wherein the information detected via sensors includes motion sensor data associated with the consumer computing device indicating whether the device was stationary or in motion during playback of the music item.

14. The system of claim 6, wherein the contextual information includes screen display state information indicating whether a screen display associated with the consumer computing device was on within a predetermined period of time associated with playback of the music item.

15. The system of claim 6, wherein the information detected via sensors includes location information of the consumer computing device.

16. The system of claim 6, wherein the music item recommendation is provided in a web page for display in a web browser application installed on the consumer computing device.

17. Non-transitory physical computer storage comprising computer-executable instructions stored thereon that, when executed by a hardware processor, are configured to perform operations comprising:

determining an intensity of a user rating of an audiovisual content item available from a music service based at least in part on contextual information associated with playback of the audiovisual content item via a consumer computing device, said contextual information identifying a physical user activity engaged in during playback of the audiovisual content item, and said contextual information being determined based on monitoring sensor information associated with the consumer computing device;

accessing listening history information associated with the user, the listening history information identifying, at least, a plurality of audiovisual content items and respective physical user activities engaged in during playback of the audiovisual content items;

ranking a plurality of candidate audiovisual content items, the candidate audiovisual content items comprising particular audiovisual content items played during engagement of the physical user activity, and the particular audiovisual content items receiving boosts in the ranking; and providing an audiovisual content item recommendation selected based on the ranking for presentation via the consumer computing device.

18. The non-transitory physical computer storage of claim 17, wherein the audiovisual content item recommendation is determined based at least in part on historical contextual information and intensity of user ratings for audiovisual content items previously accessed by the user.

19. The non-transitory physical computer storage of claim 17, wherein the audiovisual content item is a song, an audiobook, or a video.

20. The non-transitory physical computer storage of claim 17, wherein the contextual information is gathered by a mobile application installed on the consumer computing device.

21. The non-transitory physical computer storage of claim 17, wherein the audiovisual content item recommendation is provided in a web page for display in a web browser application installed on the consumer computing device.

22. The non-transitory physical computer storage of claim 17, wherein the contextual information includes one or more of: motion sensor data associated with the consumer computing device indicating whether the consumer computing device was stationary or in motion during playback of the audiovisual content item, screen display state information indicating whether a screen display associated with the consumer computing device was on playback of the audiovisual content item, or a location of the consumer computing device.

* * * * *